United States Patent [19]

Kameda et al.

[11] Patent Number: 4,883,138
[45] Date of Patent: Nov. 28, 1989

[54] FOUR-WHEEL DRIVE VEHICLE OPERATING SYSTEM

[75] Inventors: Osamu Kameda, Hiroshima; Hirokazu Yamasaki, Higashihiroshima, both of Japan

[73] Assignee: Mazda Motor Corporation, Hiroshima, Japan

[21] Appl. No.: 186,965

[22] Filed: Apr. 27, 1988

[30] Foreign Application Priority Data

Apr. 27, 1987 [JP] Japan .............................. 62-103645

[51] Int. Cl.⁴ ............................................ B60K 17/34
[52] U.S. Cl. .................................... 180/249; 180/248; 74/752 A
[58] Field of Search ............... 180/249, 247, 248, 250, 180/233; 74/752 A, 752 B, 752 C, 752 D

[56] References Cited

U.S. PATENT DOCUMENTS

| | | | |
|---|---|---|---|
| 3,268,680 | 8/1966 | Anderson | 180/333 |
| 4,562,541 | 12/1985 | Sakakiyama | 180/197 |
| 4,628,770 | 12/1986 | Kodama et al. | 180/247 |
| 4,644,822 | 2/1987 | Batchelor | 180/250 |

*Primary Examiner*—Charles A. Marmor
*Assistant Examiner*—Donn McGiehan
*Attorney, Agent, or Firm*—Fleit, Jacobson, Cohn, Price, Holman & Stern

[57] ABSTRACT

An operating system used in a vehicle equipped with a part-time four-wheel drive comprises; a center-differential shiftable between at least a two-wheel drive mode and a four-wheel differential-locked drive mode; a freewheeling device with a clutch mechanism incorporated in an output shaft of an axle differential associated with wheels which are rendered non-driven when the vehicle is traveling in the two-wheel drive mode and adapted to connect and disconnect the transmission of driving power between the axle differential and the non-driven wheel; a drive mode selecting member operated by a driver in the driver's compartment to select a desired driving mode of operation of the center-differential; and a shift control device which sequentially shifts the center-differential responding to an operation of the drive mode selecting member. The shift control device controls the center-differential to be intermediately shifted into a four-wheel differential-locked drive mode upon being shifted from one to the other between the two-wheel and four-wheel differential-locked drive modes. The shift control device shifts finally the center-differential into the other drive mode after locking the clutch mechanism to connect the transmission of driving power between the axle differential and the wheel which is rendered non-driven when the center-differential is traveling in two-wheel drive mode.

12 Claims, 11 Drawing Sheets

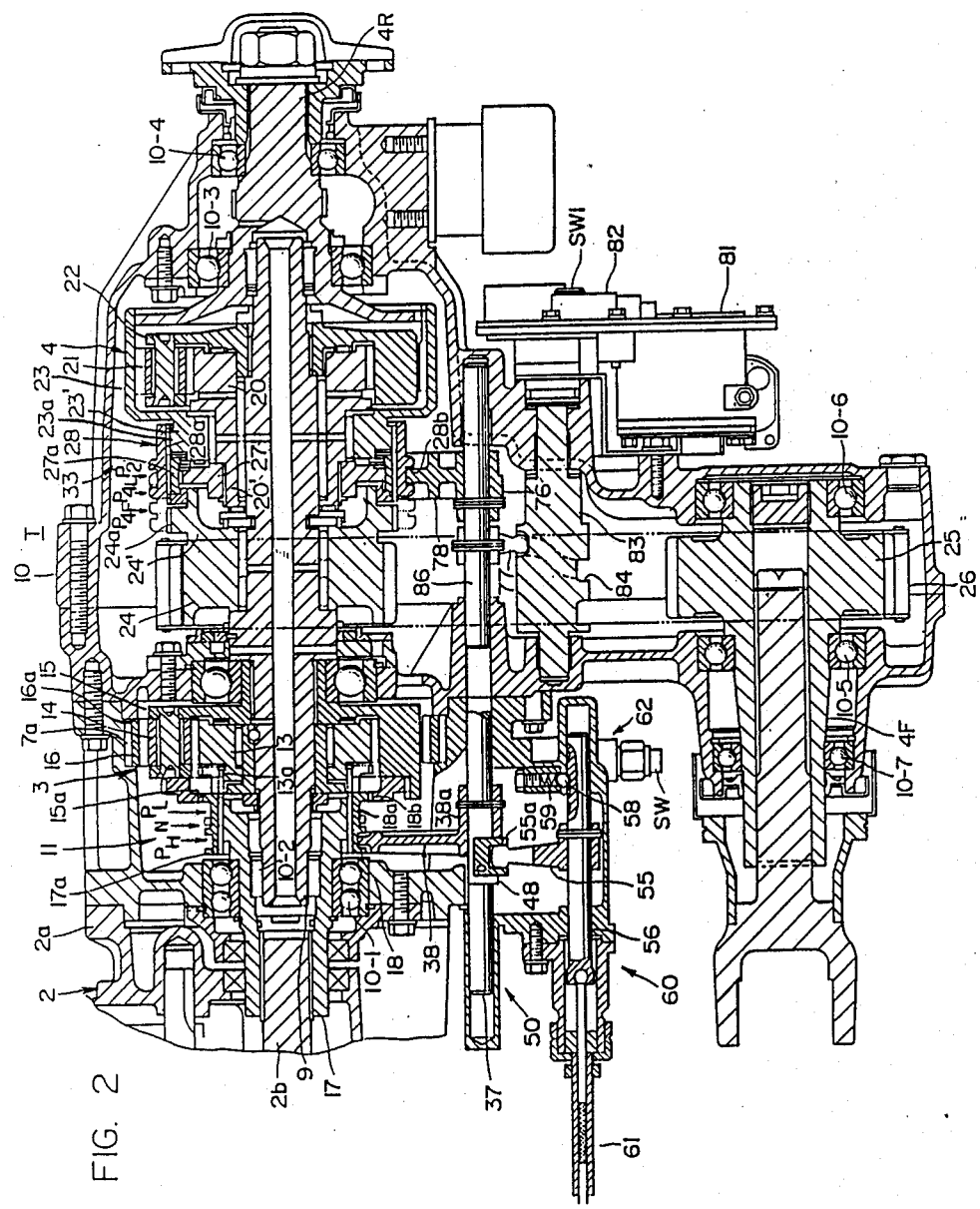

FOUR-WHEEL DRIVE VEHICLE OPERATING SYSTEM

FIELD OF THE INVENTION

The present invention relates to an operating system of a vehicle equipped with part-time four-wheel drive and, more particularly to a part-time four-wheel drive vehicle operating system for shifting a transfer case between a two-wheel drive mode and a four-wheel differential-free drive mode.

BACKGROUND OF THE INVENTION

In general, part-time four-wheel drive transfer cases used on vehicles equipped deliver driving power normally only to front or rear axle assembly nd, if desired, to both the front and rear axle assemblies. When the vehicle with its part-time four-wheel transfer case shifted into a two-wheel drive mode is in motion, gears of an axle differential case in association with non-driven wheels and a transfer case connected to the axle differential are forced to turn by the non-driven wheels, causing a torque loss.

In an attempt at avoiding such a torque loss caused in the part-time four-wheel transfer case, a free-wheeling device, with its associated clutch means, is incorporated in an axle shaft between one of the non-driven wheels and an axle differential associated with the non-driven wheels to split the axle shaft when the transfer case is in the two-wheel drive mode so as to disconnect the transmission of motion from the non-driven wheels to the axle differential. Owing to the provision of such a free-wheeling device, the transfer case is independent of motion of the non-driven wheels. One such a free-wheeling device is disclosed in, for example, U.S. Pat. No. 4,381,828 entitled "Vehicle Drive System Having First and Second Operating Modes And Method of Operating Same", issued May 3, 1983.

Meanwhile, in vehicles equipped with four-wheel drive having a center-differential which is shiftable into a differential-locked drive mode in which no differential motion is caused between front and rear wheels, the differential-locked drive mode is less frequently used than other drive modes such as a differential-free drive mode and a two-wheel drive mode. Specifically, the differential-locked drive mode is generally used to certainly transmit driving power from the engine to wheels in such a case that, for example, one of traction wheels sticks while the vehicle is running in the differential-free four-wheel drive mode. In consideration of this, it is desirable to adapt drive mode selecting means such as a manual shift lever operated by a driver to have an operated position selecting a two-wheel drive mode which is most frequently used adjacent to an operated position selecting a differential-free drive mode which has a low frequency in use.

In a case of a differential lockable transfer case equipped with a free-wheeling device, when shifting the transfer case into the four-wheel differential-free drive mode from the two-wheel drive mode, the center-differential is possibly shifted into the four-wheel differential-free mode while the free-wheeling device is not yet clutched. If the free-wheeling device is unclutched when vehicle is traveling in the four-wheel drive mode, because the free-wheeling device disconnects the transmission of driving power, the vehicle is possibly led into an unstable control of operation.

OBJECT OF THE INVENTION

It is, therefore, an object of the present invention to provide a part-time four-wheel drive vehicle operating system wherein the center-differential is shifted to a four-wheel drive mode from a two-wheel drive mode after free-wheeling device means has certainly been clutched.

It is another object of the present invention to provide a part-time four-wheel drive vehicle operating system wherein a drive mode selecting operation can be quickly made.

It is still another object of the present invention to provide a part-time four-wheel drive vehicle operating system wherein a vehicle is prevented from being led into an unstable control of operation during a transition of a transfer case between two-wheel drive mode and a four-wheel drive mode.

SUMMARY OF THE INVENTION

In accomplishing the above and other object of the present invention in a vehicle equipped with part-time four-wheel drive having a transfer case with a center-differential shiftable between at least a two-wheel drive mode and a four-wheel differential-free drive mode and free-wheeling means for connecting or disconnecting the transmission of driving power between an axle differential case and a wheel associated with the axle differential case when the transfer case is shifted into the two-wheel drive mode, the operating system includes a step of effecting a transition of the center-differential to a differential-locked drive mode when shifting the transfer case between the two-wheel and four-wheel differential-free drive modes.

According to a preferred embodiment of the present invention, when driving mode selecting means is operated by a driver in a driver's compartment to shift the transfer case from the two-wheel drive mode to the four-wheel differential-free drive mode, the free-wheeling means is clutched during the shift of the center-differential into the four-wheel differential-free drive mode so as to complete the transition of the transfer case. During the shift of the four-wheel differential-locked drive mode into the four-wheel drive mode from the two-wheel drive mode, the four-wheel differential-free drive mode is intermediately caused in the center-differential. Owing to the intermediate differential locked drive mode caused in the center-differential, the transmission of driving power is effected between the engine and traction wheels other than the wheels associated with the axle differential equipped with the free-wheeling means even when the free-wheeling means is not yet clutched during the transition of the center-differential to the four-wheel differential-free drive mode from the two-wheel drive mode, resulting in a stable control of operation of the vehicle.

BRIEF DESCRIPTION OF THE DRAWINGS

In the detailed description of the preferred embodiment of the present invention presented below, reference is had to the accompanying drawings, in which:

FIG. 2 is a sectional view of a transfer case used in the part-time four-wheel drive vehicle of F 1A and 1B;

DETAILED DESCRIPTION OF THE INVENTION

A transfer case according to a preferred embodiment of the present invention incorporates various elements, in particular an engine, a transmission, front and rear axle assemblies and so forth, similar to those of conventional power trains. Because such elements are well known to those skilled in the art, this description will be directed in particular to elements forming part of, or cooperating directly with, the transfer case embodying the present invention. It is to be understood that transfer case elements not specifically shown or described herein may be selected from those known in the art.

Figure 1A:
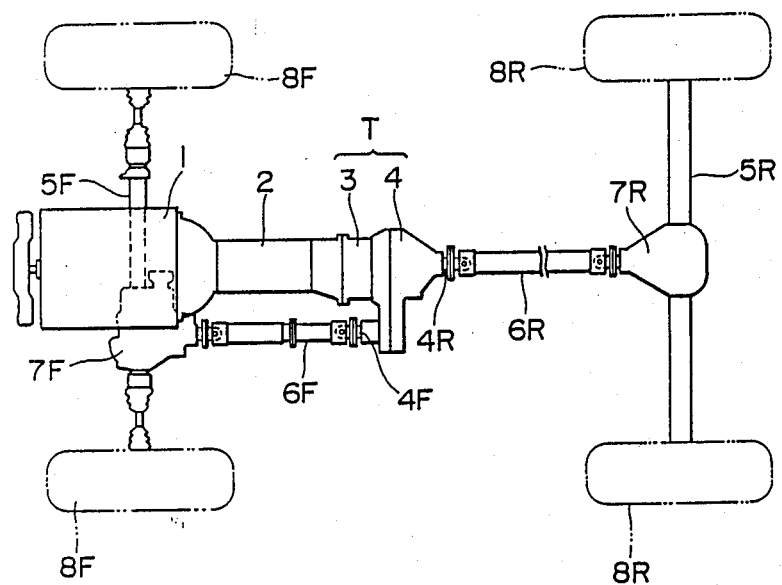
FIGS. 1A and 1B are schematic illustrations showing a part-time four-wheel vehicle embodying the present invention.
Figure 1B:
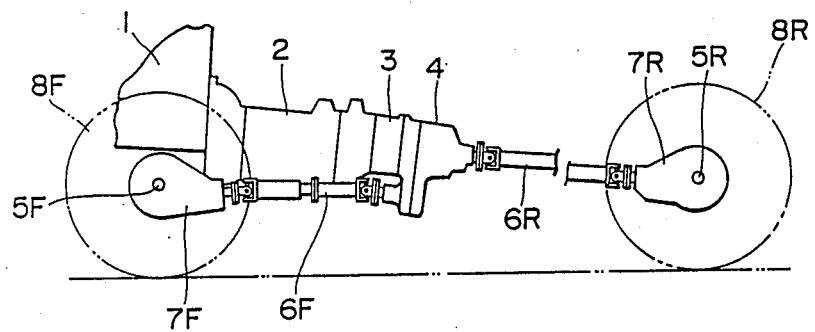

Referring now to the drawings, wherein like reference characters designate corresponding or similar parts or elements throughout the several views, there is generally schematically shown in FIG. 1A and 1B a vehicle equipped with part-time four-wheel drive which has an engine unit 1, a manual transmission case 2 connected to the engine unit 1 through an engine clutch ( not shown ), a transfer case T comprising a transfer gear assembly 3 and a center-differential gear assembly 4 arranged in order from the front side of the vehicle. A rear wheel drive shaft or rear output shaft 4R of the transfer case T is coupled to a rear axle shaft 5R through a rear propeller shaft 6R and a rear axle differential gear assembly 7R by which a pair of rear wheels 8R are turned differentially. A front wheel drive shaft or front output shaft 4F of the transfer case T, which is laterally spaced from and located in parallel with the rear output shaft 4R, is coupled to a front axle shaft 5F through a front propeller shaft 6F and a front axle differential gear assembly 7F by which a pair of front heels 8F are turn differentially. As is generally well known to those skilled in the art, each propeller shaft 6R, 6F is coupled at its both ends to the output shaft 4R, 4F and the axle differential gear cases 7R, 7F by means of universal joints.

Referring now to FIG. 2 shown therein in longitudinal section is the transfer case T comprising the transfer gear assembly 3 and the center-differential gear assembly 4, each of which basically comprises a planetary gear assembly. As shown, the transfer case T has a transfer case housing 10 connected to a transmission case housing 2a of the transmission case 2. The transfer case T has three rotatable shafts, namely a transfer input shaft 9 located coaxially relative to an output shaft 2b of the transmission case 2 held in the transfer case housing 10 for rotation; the rear output shaft 4R located coaxially relative to the transfer input shaft 9 and held by ball bearings 10-3 and 10-4 in the transfer case housing 10 for rotation; and the front output shaft 4F laterally spaced from and located in parallel with both the transfer input shaft 9 and the rear output shaft 4R and held by ball bearings 10-5, 10-6 and 10-7 in the transfer case housing 10 for rotation. The transfer gear assembly 3 and the center-differential gear assembly 4 which will be described in detail later are mounted on the transfer input shaft 9. Arranged coaxially with the transfer gear and the center-differential gear assemblies 3 and 4 are two shift mechanisms; namely a transfer gear shift means 11 in cooperation with the transfer gear assembly 3 disposed on the front or left side of the transfer gear assembly 3 and a differential gear shift means 33 in cooperation with the center-differential gear assembly 4 on the front or left side of the center-differential gear assembly 4.

The transfer gear assembly 3 which is selectively shiftable into a desired drive range, namely a low speed drive range or a high speed drive range (which are hereinafter noted by L or H drive mode on descriptive listings), to transmit driving power with or without torque multiplication from the transmission case 2 to the center-differential gear 4, consists of a planetary gear assembly. This planetary gear assembly has a sun gear 13 mounted on the transfer input shaft 9 for rotation; a plurality of pinion gears 14 meshed with the sun gear 13 and supported by a carrier member 15 spline-coupled to the transfer input shaft 9; and a ring gear 16 in mesh with the pinion gears 14. The ring gear 16 is provided with external threads 16a which are in mesh with internal threads 7a formed on inner surface of the transfer case housing 10 so as to be fixedly held in the transfer case housing 10.

Figure 3:
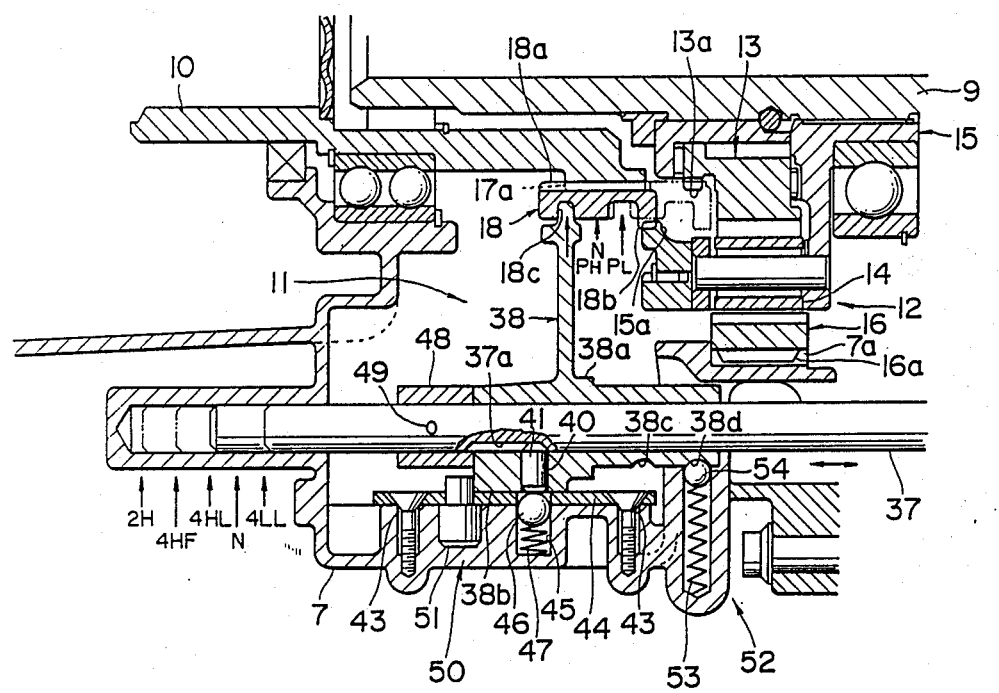
FIG. 3 is a sectional view showing details of a skid shift means provided in association with the transfer case of F 2.

The sun gear 13 is formed with external splines 13a on its front outer periphery and the carrier 15 has an internal splines 15a formed on its front inner surface. A sleeve shaft 17 spline-coupled to the output shaft 2b of the transmission case 2 is supported by the transfer housing 10 through ball bearing 10-1 for rotation and rotatably receives therein the front end of the transfer input shaft 9 through a needle bearing 10-2. The sleeve shaft 17 is formed on its rear peripheral surface with external splines 17a coaxial with the splines 13a of the sun gear 13. Spline-coupled to the sleeve shaft 17 is a shift member 18 in the form of a sleeve which is formed with internal splines 18a engageable with the splines 13a of the sun gear 13 and with external splines 18b engageable with internal splines 15a of the carrier member 15. The shift sleeve member 18 is axially displaced along the splines 17a of the sleeve shaft 17 to shift the transfer gear assembly 3 to a desired speed range; H or L drive mode. When the shift sleeve member 18 is placed at a high speed range selecting position ($P_H$) as is shown in FIG. 2, the shift sleeve member 18 is brought into mesh with the carrier member 15, coupling the output shaft 2b of the transmission case 2 to the input shaft 9 of the transfer gear assembly 3 to directly transmit driving power therebetween without torque multiplication or gear ratio reduction. On the other hand, when the shift sleeve member 18 is placed at a low speed range selecting position ($P_L$) as is shown by a phantom line in FIG. 2, the shift sleeve member 18 is disengaged from the carrier member 15 and is brought into mesh with the sun gear 13 through the spline 13a, coupling the output shaft 2b of the transmission case 2 to the input shaft 9 of the transfer gear assembly 3 through the sun gear 13, the pinion gears 14 and the carrier member 15 so as to transmit driving power therebetween with torque multiplication or gear ratio reduction. The shift sleeve member 18 can be placed in a neutral position (N) between the positions $P_H$ and $P_L$ as is shown in FIG. 3 to maintain the transfer gear assembly 3 in a neutral condition.

Coaxially with and spaced apart from the transfer gear assembly 3, there is a center-differential gear assembly 4 mounted on the transfer input shaft 9 of the transfer case T. This center-differential gear assembly 4 comprises a planetary gear assembly having a sun gear 20 mounted on the transfer input shaft 9 for rotation, a carrier member 22 which is spline-coupled to the transfer input shaft 9 and carries a plurality of pinion gears 21, and a ring gear 23 fixedly coupled to the rear output shaft 4R.

Rotatably mounted on the transfer input shaft 9 between the transfer gear assembly 3 and the center-differential gear assembly 4 is a driving sprocket wheel 24 which is connected to a driven sprocket wheel 25 formed integrally with the front output shaft 4F by means of a driving chain 26 (shown by a dotted line in FIG. 2). Through these driving and driven sprocket wheels 24 and 25, driving power is transmitted from the transfer input shaft 9 of the transfer case T to the front output shaft 4F.

The sun gear 20 and the ring gear 23 of the planetary gear assembly of the center-differential gear assembly 4 have front extensions 20' and 23' formed integrally therewith, respectively. Spline-coupled to the front extension 20' of the sun gear 20 is a clutch hub 27 formed with external splines 27a. On the other hand, rotatably mounted on the front extension 20' of the sun gear 20 is the front extension 23' of the ring gear 23 which is formed with external splines 23a coaxial with the splines 27a of the clutch hub 27. The driving sprocket wheel 24 has a rear extension 24' having external splines 24a coaxial with the external splines 27a of the clutch hub 27. Slidably spline-coupled to these external splines 23a, 24a and 27a of the ring gear 23, the driving sprocket wheel 24 and the clutch hub 27 is a shift member 28 in the form of a sleeve through its internal spline 28a. By these elements, namely the shift sleeve member 28, the rear extension 24' of the driving sprocket wheel 24, the clutch hub 27 and the front extension 23' of the ring gear 23, center-differential gear shift means 33 is formed.

The shift sleeve member 28 can be selectively placed in three positions to shift the center-differential gear assembly 4 between a 4-wheel differential-free drive mode, a 4-wheel differential-locked drive mode and a 2-wheel drive mode (which are hereinafter noted by 4W-DF, 4W-DL and 2W drive modes, respectively on descriptive listings). More specifically, when the shift sleeve member 28 is placed in a position $P_{4F}$ shown by a phantom line in FIG. 2 to select the 4W-DF drive mode, the shift sleeve member 28 couples or lock together the clutch hub 27 and the driving sprocket wheel 24 through their splines 24a, 27a and 28a and, simultaneously, uncouples the sun gear 20 and the ring gear 23 of the planetary gear assembly of the center-differential gear assembly 4, thereby to shift the center-differential gear assembly 4 into the 4W-DF drive mode. When the shift sleeve member 28 is placed in a position $P_{4L}$ shown by a solid line in FIG. 2 to select the 4W-DL drive mode, the shift sleeve member 28 couples the driving sprocket wheel 24 and the clutch hub 27 as well as the sun gear 20 and the ring gear 23 of the planetary gear assembly of the center-differential gear assembly 4 all together, thereby to shift the center-differential gear assembly 4 into the 4W-DL drive mode. Finally, when the shift sleeve member 28 is placed in a position $P_2$ shown by a phantom line in FIG. 2 to select the 2W drive mode, the shift sleeve member 28 couples the sun gear 20 and the ring gear 23 of the planetary gear assembly of the center-differential gear assembly 4, simultaneously with uncoupling the clutch hub 27 from the driving chain sprocket wheel 24, thereby to shift the center-differential gear assembly 4 into the 2W drive mode.

Arranged in juxtaposition with the transfer input shaft 9 of the transfer case T is a skid shift means 50 for causing mechanically the transfer gear shift means 11 to selectively shift the transfer gear assembly 3 between two different drive ranges, namely, the low speed drive range (L drive mode) and the high speed drive range (H drive mode) and for electrically actuating differential gear shift means 33 to selectively shift the center-differential gear assembly 4 between the 2W and 4W drive modes and/or the DF and DL drive modes.

As is shown in detail in FIG. 3, the skid shift means 50 includes a shift rod 37 spaced laterally from and in parallel with the input shaft 8 of the transfer case T which is slidably supported by the transfer case housing 10 for axial movement but prevented from rotation. The shift rod 37 is selectively placed in four different drive mode selecting positions and neutral mode selecting position corresponding to the four drive modes into which the transfer case T is shiftable, namely, 2W-H (2-wheel, high-speed range) drive mode, 4W-DF-H (4-wheel, differential-free, high-speed range) drive mode, 4W-DL-H (4-wheel differential-locked, high-speed range) drive mode and 4W-DL-L (4-wheel differential-locked, low-speed range drive mode, in order from the front or the left as viewed in FIG. 4 and a neutral mode between the 4W-DL-H and 4W-DL-L drive modes. Slidably mounted on the shift rod 37 is a boss 38a of a shift fork 38 slidably received by an annular groove 18c of the shift sleeve member 18 of the transfer gear shift means 11. Formed underside the boss 38a of the shift fork 38 is formed with a surface 38b slidably contacting to an inner surface of a guide plate 44 bolted at points 43 to the transfer case housing 10. The boss 38a of the shift fork 38 is further formed with a radial through hole 40 in which a pin 41 is slidably received. The inner end of the pin 41 is slidably received within an axial groove 37a formed in the outer periphery of the shift rod 37. Although the groove 37a has its axial length necessary to receive the pin 41 therein, it is advantageous to form a relatively long axial groove 37a in order to relieve air or oil therefrom. There is formed in the transfer case housing 10 a blind bore 45 in which disposed are a steel ball 46 and a spring 47 for forcing the steel ball 46 against the outer end of the pin 41 so as to maintain the inner end of the pin 41 received within the axial groove 37a of the shift rod 37 or slidably contacting the outer periphery of the shift rod 37.

Fastened by a knock pin 49 to the shift rod 37 is an annular connecting ring 48 disposed on the front side of the boss 38a of the shift fork 38. There is a restriction stud 51 projecting from the transfer case housing 10 or the guide plate 44 which is abutted by the boss 38a of the shift fork 38 when the shift rod 37 is axially displaced beyond the 4W-DL-H drive mode selecting position from the right to the left as viewed in FIG. 3, so as to restrict the boss 38a of the shift fork 38 to axially slide to the left while allowing the shift rod 37 to be displaced further to the left. When the boss 38a of the shift fork 38 is restricted by the restriction stud 51, the shift fork 38 is so positioned as to place the shift sleeve member 18 of the transfer gear shift means 11 in the position $P_H$ where the transfer gear assembly 3 is shifted into the high speed drive range, or the H drive mode. Although the shift fork 38 is prevented from being displaced beyond the position $P_H$, the shift rod 37 can be displaced in the forward direction beyond the 4W-DL-H drive mode selecting position to the 2W-H drive mode selecting position. Specifically, when the shift rod 37 is urged in the forward direction, the tapered end of the axial groove 37a forces the pin 41 to retract against the spring 47 out of the axial groove 37a, so that the shift rod 37 is allowed to axially move, leaving the shift fork 38 at the position $P_H$. On the other hand, when the shift rod 37 is axially displaced in the rearward direction or to the right as viewed in FIGS. 2 and 4 beyond the 4W-DL-H drive mode selecting position, the shift fork 38 is pushed by the annular connecting ring 48 to the right so as displace the shift sleeve member 18 of the transfer gear shift means 11 to the position $P_L$ from the position $P_H$. As a result of this displacement of the shift sleeve member 18, the transfer gear assembly 3 is shifted into the low speed drive range, or the L drive mode. At this time, since the pin 41 is slidably received within the axial groove 37a, much less thrust force is needed to displace axially the shift rod 37. Apparent from the above description, the transfer gear shift means 11 can be operated with a relatively light force to shift the transfer gear assembly 3 between the high speed range or H drive mode and the low speed range or the L drive mode. For positively placing the shift fork 38 in the position $P_H$ or $P_L$, there is a click stop mechanism 52 which is well known in the art and comprises two semi-spherical recesses 38c and 38d formed in the peripheral surface of the rear section of the boss 38 of the shift fork 38 and axially spaced away from each other, a steel ball 54 and a spring 53 for forcing the steel ball 53 received in a blind hole 53a formed in the transfer case housing 10.

Figure 4:
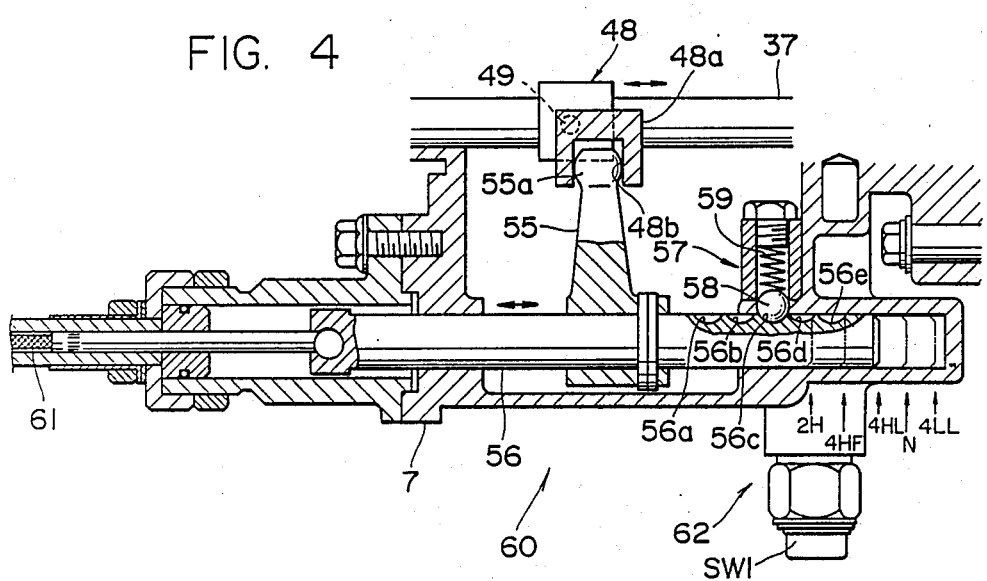
FIG. 4 is a sectional view showing details of a shift control means provided in association with the transfer case of FIG. 2.

For effecting the above-described drive mode shifting of the transfer case T, there is transfer case shift control means 60 shown in detail in FIG. 4. Although, the transfer case shift control means 60 is practically arranged in a plane perpendicularly intersecting the drawing and side by side with respect to the shift mechanism 50, the transfer case shift control means 60 in FIG. 2 is turned through a right angle and illustrated below the skid shift mechanism 50 for easy understanding. As shown in FIG. 4, there is a shift control rod 56 disposed in juxtaposition with the shift rod 37 and supported by the transfer case housing 10 for axial movement to left and right. The shift control rod 56 is provided with a connecting arm 55 fixed thereto. The rounded top end 55a of the connecting arm 55 is received in an engaging recess 48b of a connecting hook 48a which is fixed to the annular connecting ring 48 fixedly mounted on the shift rod 37 of the skid shift mechanism 50. In the outer periphery of the rear end portion of the shift control rod 56, there are formed five substantially semi-spherical recesses 56a to 56e axially arranged at regular intervals. Facing to these recesses 56a to 56e, there is provided in the transfer case housing 10 a click stop mechanism 57 which is well known in the art and comprises a steel ball 58 and a spring 59 forcing the steel ball 58 to enter into one of these recesses 56a through 56e formed in the shift control rod 56. Owing to the provision of the click stop mechanism 57, the control rod 56 is certainly positioned at five different drive mode selecting positions corresponding to the above-described five drive mode selecting positions including the neutral mode selecting position, namely in order from the front, 2W-H drive mode, 4W-DF-H drive mode, 4W-DL-H drive mode, neutral mode and 4W-DL-H drive mode selecting positions.

For detecting the shift control rod 56 placed in each drive mode selecting position, there is an axial position sensor 62 comprising limit switches SW disposed in the transfer case housing 10 angularly spaced at a right angle around the control rod 56. The shift control rod 56 is formed at its rear end portion with two series of steps which can be detected by the switches SW1. As a result of the axial movement of the control rod 56, each switch SW1 provides a position signal corresponding to a selected drive mode selecting position. These position signals are sent to a controller 100 shown in FIG. 6.

Referring again to FIG. 2, for shifting the transfer case T, in particular the center-differential gear assembly 4 between 2W and 4W drive modes and/or DF and DL drive modes through the center-differential gear shift means 33, the controller 100 is used to control the drive motor 81 with its associated reduction gear 82 which is operationally coupled to the shift control rod 83 supported by the transfer case housing 10 for rotation and having a cam groove 84. Disposed in juxtaposition with the shift control rod 83 is a guide rod 86 to which a sleeve member 76 is fixedly mounted. The sleeve member 76 is provided with a connecting pin 77 by which the cam groove 84 of the shift control rod 83 is slidably engaged and with a shift fork 78, the connecting pin 77 and shift fork 78 being axially spaced from and extending radially oppositely to each other. The shift fork 78 is in slidable engagement with an annular groove 28b formed on the outer periphery of the shift sleeve member 28 of the differential gear shift means 33.

The shift control rod 83 is associated with a mode sensor SW1 which detects a shifted drive mode of the center-differential based on an angular position of the shift control rod 83 to provide a mode signal which in turn sent to the controller 100.

Figure 5:
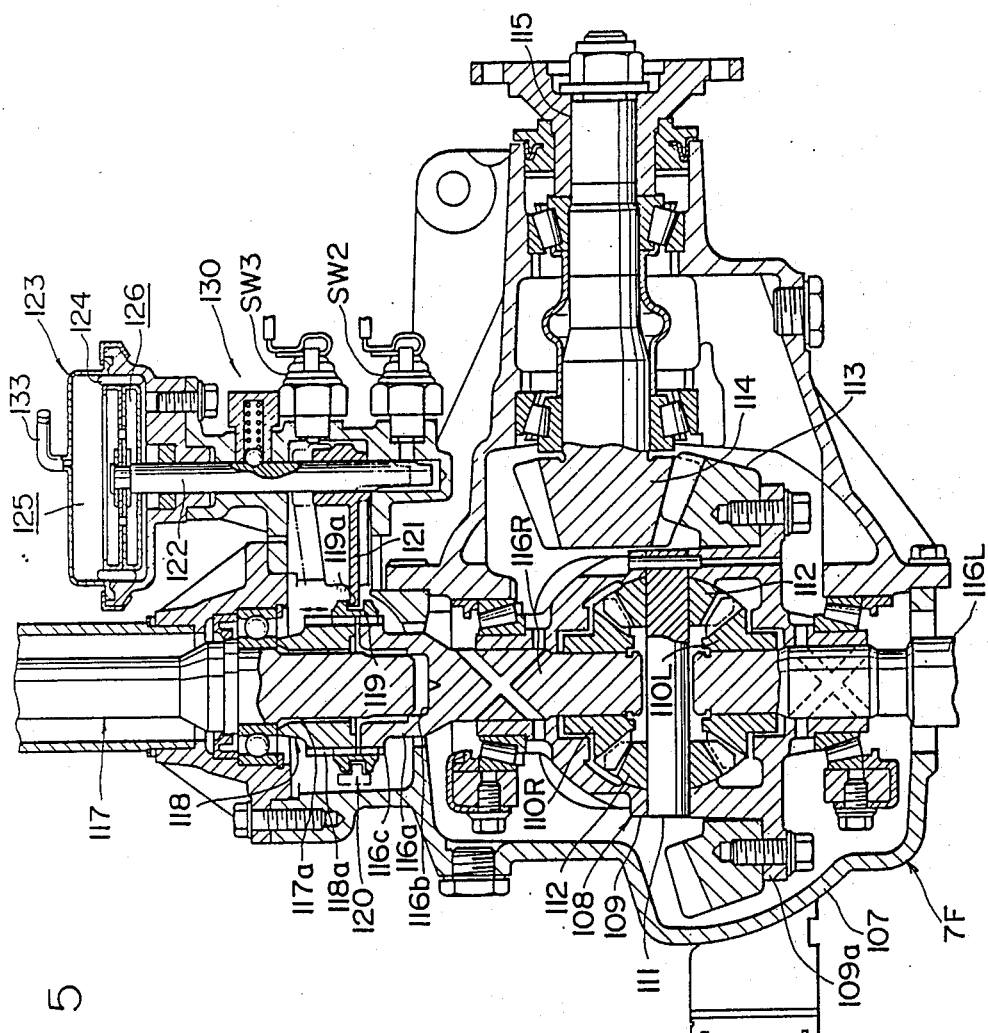
FIG. 5 is a sectional view showing details of an axle differential with a free-wheeling means provided in a front axle shaft.

Reference is now had to FIG. 5 showing the front axle differential case 7F in detail. AS shown, the front axle differential case 7F has a front differential housing 107 in which a front axle differential gear assembly 108 is supported for rotation This front axle differential gear assembly 108 comprises a differential carrier 109 supported by and within the front axle differential housing 107 for rotation; left and right side half axle shafts 116L and 116R, which form parts of the front axle shaft 5F; a pair of differential side gears 110L and 110R splined to the inner end of the left and right side half shafts 116L and 116R, respectively; and a pair of differential pinions 112 which are fixedly mounted on a pinion shaft 111 supported by and disposed within the differential carrier 109 and are in mesh with the differential side gears 110L and 110R. Bolted to an annular flange 109a of the differential carrier 109 is a ring gear 113 in the form of a bevel gear which is in mesh with a driving pinion gear 114 formed integrally with an input shaft 115 coupled to the front output shaft 7F of the transfer case T through the front propeller shaft 6F.

Coaxially disposed on the right side of the front axle differential case 7F is axial splitting means 120 of the front free-wheeling means 130. Coaxially disposed adjacent to the right side half axle shaft 116R which is one of the output shaft of the front axle differential case 7F is a joint axle 117 coupling together right side half axle 116R and the right side front wheel 8F. The joint axle 117 has its inner spindle section 117a having a diameter smaller than that of the major portion thereof and, on the other hand, the right side half axle 116R has its outer enlarged section 116a formed with a bore 116b which receives and supports therein the inner spindle section 117a of the joint axle 117 for rotation.

On the outer periphery of the enlarged section 116a of the right side half axle 116, there are formed with splines 116c. To the inner spindle section 117a of the joint axle 117, an annular ring 118 formed with external splines 118a is splined. A shift sleeve clutch 119 is provided to lock together and unlock the right side half axle 116R and the joint axle 117 through a spline coupling. When the shift sleeve clutch 119 locks together these axle 116R and 117, the front axle differential case 7F is directly connected to the right side front wheel 8F to transmit driving power to the same. However, if the shift sleeve clutch 119 is displaced to unlock or split the right side half axle 116R and the joint axle 117, no driving power is transmitted between the front axle differential case 7F and the right side front wheel 8F.

The shift sleeve clutch 119 is formed with an external annular recess 119 for receiving a shift fork 121 fixed to a shift control rod 122. At one end of the shift control rod 122, there is diaphragm means 123 functioning as an actuator for the shift control rod 122. This diaphragm means 123 comprises a diaphragm member 124 connected to the out end of the shift control rod 122, first and second pressure chambers 125 and 126 divided by the diaphragm member 124 in a housing.

Figure 6:
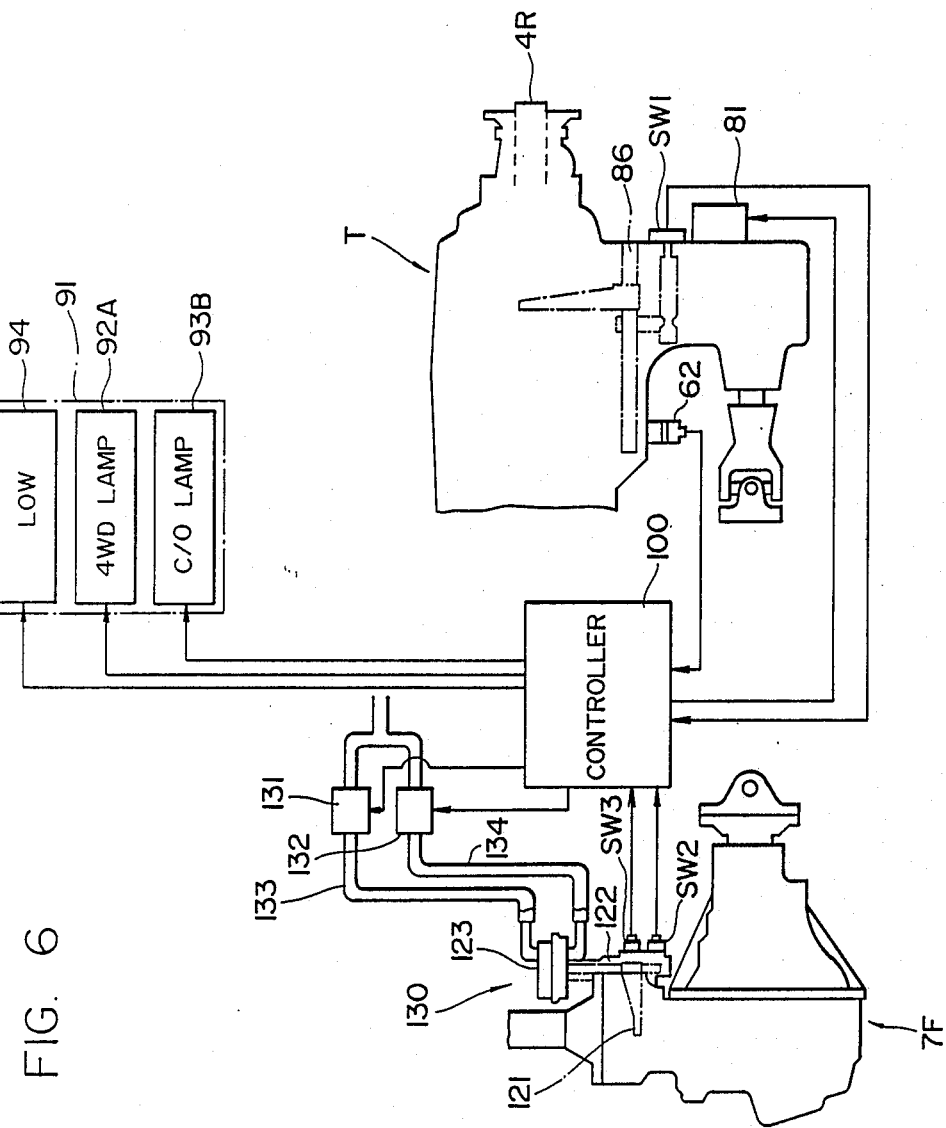
FIG. 6 is a fragmentary diagram, partly in block diagram, showing the part-time four-wheel drive vehicle operating system according to the present invention.

As is shown in FIG. 6, the first and second pressure chambers 125 and 126 are in communication with an intake pipe (not shown) of the engine unit 1 through pipes 133 and 134, respectively, so as to introduce negative pressure thereinto. In the pipes 133 and 134, there are normally closed first and second solenoid valves 131 and 132, respectively, to control the axle splitting means 120. In more detail, when the first solenoid valve 131 is opened, the pressure inside the first pressure chamber 125 becomes more low relative to the pressure in the second pressure chamber 126 so as to deflect the diaphragm member 124 toward the first pressure chamber 125, thereby to displace axially the shift control rod 122 to the right. As a result, the shift sleeve clutch 119 is displaced to the right from the position shown in FIG. 5 so as to unlock the right side half axle 116R of the front axle differential case 7F from the joint axle 117 connected to the right side front wheel 8F. When these axles 116R and 117 are unlocked, no motion of the front wheel 8F is transmitted to the differential side gears 110R and the differential pinion gears 112 of the front axle differential case 7F, thereby no differential motion is caused between the front wheels 8F and the transfer case T is not affected by the motion of the front wheels 8F. The shift control rod moved to the right is detected by means of a free-wheeling unlock sensor SW3 such as a limit switch to provide an unlock signal indicating that the axle splitting means 120 is completely unlocked.

On the other hand, when the second solenoid valve 130 is opened, the pressure chamber 126 becomes negative with respect to the first pressure chamber 125 so as to deflect the diaphragm member 124 toward the second pressure chamber 126, thereby to displace the shift control rod 122 to the left as shown in FIG. 5. As a result, the shift sleeve clutch 119 is displaced in the opposite side and returns to the position shown in FIG. 5 so as to lock together the right side half axle shaft 116R and the joint axle 117. Through the right side half axle shaft 116R and the joint axle 117 locked together, an ordinary differential motion is caused between the front wheels 8F. The shift control rod 122 moved to the left is detected by means of a free-wheeling lock sensor SW2 such as a limit switch to provide a lock signal indicating that the axle splitting means 120 is completely locked.

Figure 7A:
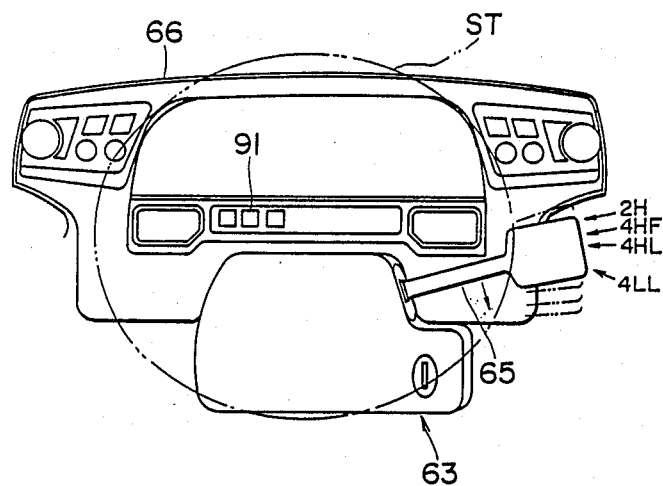
FIG. 7A to 7C are illustrations showing drive mode selecting means used in association with the part-time four-wheel drive vehicle operating system of FIG. 6.
Figure 7B:
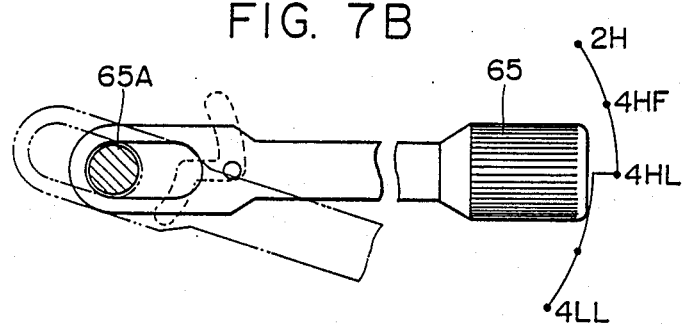

For actually effecting the above-described drive mode shifting of the transfer case T, there is drive mode selecting means with a drive mode selecting lever such as a column shift lever operated by the driver in the driver's compartment. As is shown in FIGS. 7A and 7B, the drive mode selecting means 63 includes the drive mode selecting lever 65 rotatably mounted on a steering column 65A mounting a steering wheel ST. The drive mode selecting lever 65 is shiftable between four selecting positions, namely in order from the top, 2W-H drive mode, 4W-DF-H drive mode, 4W-DL-H drive mode, and 4W-DL-L drive mode selecting positions, to select a desired drive mode of operation of the transfer case T. It is noted in this embodiment that, when the drive mode selecting lever 65 is shifted between the 4W-DL-H drive mode and 4W-DL-L drive mode selecting positions, the drive mode selecting lever 65 is radially pushed or pulled as is shown in FIG. 7B. Corresponding to the operation of the drive mode selecting lever 65, the shift control rod 56 of the transfer case shift control means 60 is selectively placed in the drive mode selecting positions through the push-pull type cable 61. Owing to the provision of the position sensor 62, each drive mode selected by the drive mode selecting lever 65 can be electrically detected as an axial position of the shift control rod 56. When the drive mode selecting lever 65 is manipulated and the axial position sensor 62 provides an axial position signal, the controller 100 causes the motor 81 to shift the transfer case T, in particular the center-differential gear assembly 4. As the result of transition of the center-differential gear assembly 4 to a drive mode selected by the drive mode selecting lever 65, the controller 100 receives a mode signal from the mode sensor 90 so as to stop the motor 81.

Figure 7C:
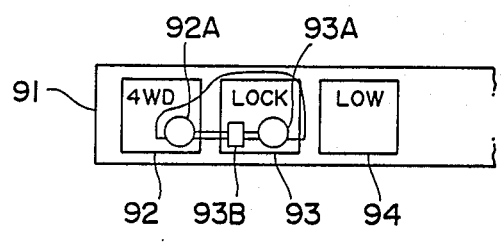

In FIG. 6, connected to the controller 100 is a drive mode graphic display 91 installed in an instrument panel 66 shown in FIG. 7C. This graphic display 91, which lights up and flashes to indicate drive modes, includes four-wheel drive mode indicator (4WD lamp) 92, center-differential-locked drive mode indicator (Lock) 93, and L drive mode indicator (Low) 94 arranged in order from the left in FIG. 7C. Illustrated between the indicators 92 and 93 is a vehicle. A front wheel in the 4WD indicator 92 is formed an illumination lamp (4WD lamp) 92A and a rear wheel in the Lock indicator 93 is painted as a circle 93B. Between the front and rear wheels there is a lamp (CD lamp) 93B turned on when the center-differential is locked. The 4WD lamp 92A is turned on in a 4W drive mode and turned off in a 2W drive mode. The C/D lamp 93B is turned on in a center-differential-locked drive mode and turned off in the center-differential-free drive mode.

In operation of the operating apparatus of the preferred embodiment according to the present invention constructed as described above, the drive mode selecting lever 65 is manipulated by the driver in the driver's compartment to select a desired drive mode of the transfer case T. All the elements of the transfer case T are positioned shown in FIG. 2, 4 and 5 when the transfer case T is in the 4W-DL-H drive mode.

When the drive mode selecting lever 65 is manually operated and moved up to the 2W-H drive mode selecting position (2H) from the 4W-DL-H drive mode selecting position (4HL), the control rod 56 is displaced axially in a direction to the front or left side as viewed in FIG. 2 to force the shift rod 37 to move axially in the same direction. The boss 38a of the shift fork 38 is, as is shown in FIG. 4, prevented from moving axially in the forward direction by the restriction stud 51, no shifting operation is caused in the transfer gear shift means 11 so as to maintain the transfer gear assembly 3 in the high speed drive range, namely the H drive mode. On the other hand, the position sensor 62 detects the shifted position of the control rod 56 to provide the controller 100 with the position control signal. By the presence of the position signal, the controller 100 causes the electric motor 81 to rotate so as to turn the shift control rod 83 through the reduction gear 82 until the mode sensor 90 provides a mode signal. As a result, the guide rod 86 is axially displaced to the rear or right side as viewed in FIG. 2 through the sliding engagement between the can groove 84 of the control rod 83 and the connecting pin 77 of the guide rod 86 to place the shift sleeve member 28 of the differential gear shift means 33 in the position P$_2$. As is previously described, when the shift control rod 83 turns through an angle necessary to place the shift sleeve member 28 in the position P$_2$, the mode sensor 90 provides the controller 66 with an mode signal. By the presence of the mode signal, the controller 66 stops the motor 81. In such a way, the center-differential gear assembly 4 is shifted in the 2W drive mode from the 4W-DL drive mode while the transfer gear assembly 3 is maintained in the H drive mode, namely, the transfer case T is shifted in the 2W-H drive mode.

When the drive mode selecting lever 65 is moved to select the 4W-DF-H drive mode, the control rod 56 is axially displaced to the 4W-DF-H drive mode selecting position 4HF either from the 4W-DL-H drive mode selecting position 4HL or from the 2W-H drive mode selecting position, forcing the shift rod 37 to move axially to the 4W-DF-H drive mode selecting position 4HF. Although the shift rod 37 is axially displaced in any direction toward the selecting position 4HF, the boss 38a of the shift fork 38 of the transfer gear shifting means 11 stays at the same position without shifting the shift sleeve member 18 from the position P$_H$ to either the position N or the position P$_L$, the transfer gear assembly 3 is maintained in the H drive mode. On the other hand, when the control rod 56 is axially displaced and placed in the 4W-DF-H drive mode selecting position 4HF, the position sensor 62 detects the position of the control rod 56 to provide the controller 100 with the position control signal, Consequently, the controller 100 causes the motor 81 to rotate so as to turn the shift control rod 83 through the reduction gear 82, axially displacing the guide rod 86 through the sliding engagement between the cam groove 84 and the connecting pin 77 to move the shift sleeve member 28 of the differential shift means 33 toward the position P$_{4F}$. When the shift control rod 83 turns through an angle necessary to place the shift sleeve member 28 in the position P$_{4F}$, the mode sensor 90 provides the controller 100 with a mode signal so as to stop the electric motor 81. In such a way, the center-differential gear assembly 4 is shifted in the 4W-DF drive mode while the transfer gear assembly 3 is maintained in the H drive mode, so as to shift the transfer case T in the 4W-DF-H drive mode.

As is apparent from the above description, when the drive mode selecting lever 65 is manually manipulated by the driver between the three selecting positions, namely the 2W-H, 4W-DF-H and 4W-DL-H drive mode selecting positions, the transfer gear shift means 11 is never actuated, so that the transfer gear assembly 3 is maintained in the H drive mode by means of the skid shifting mechanism 50 while the shift rod 37 is axially displaced to cause the motor 81 to turn in order to shift the center-differential gear assembly 4.

On the other hand, when it is desired to shift the transfer case T into the 4W-DL-L drive mode, the drive mode selecting lever 65 is pushed radially inwardly and then pulled downwardly to select the 4W-DL-L drive mode. This manipulation of the drive mode selecting lever 65 causes the axial movement of the control rod 56 to the rear or right side as viewed in FIG. 2 and 4 toward the 4W-DL-L drive mode selecting position 4LL thereof. Through the engagement of the annular connecting ring 48a fixed to the connecting sleeve 48 of the shift rod 37 and the connecting pin 55 of the shift control rod 56, the shift rod 37 is axially displaced in the same direction as the control rod 56. Because of the connecting sleeve 48 fixed to the shift rod 37, the shift fork 38 is forced by the connecting sleeve 48 to move axially to the right side, shifting the shift sleeve member 18 of the transfer gear shift means 11 to the position P$_L$ so as to shift the transfer gear assembly 3 into the L drive mode. Simultaneously with the transition of the transfer gear assembly 3 to the L drive mode, the axial position sensor 62 detects the control rod 56 to provide the controller 100 with a position signal. The controller 100, upon receiving the position signal, causes the electric motor 81 to rotate so as to turn the shift control rod 83, axially displacing the guide rod 86 through the sliding engagement between the cam groove 84 of the shift control rod 83 and the connecting pin 77 of the guide rod 86. As a result, the shift sleeve member 28 engaged by the shift fork 78 is displaced toward the position $P_{4L}$. At the moment the shift sleeve member 28 is placed in position, the mode sensor 90 provides the controller 100 with the mode signal. Responding to the provision of the mode signal, the controller 100 stops the motor 81 to complete the transition of the center-differential gear assembly 4 to the 4W-DL drive mode, and hence the transition of the transfer case T to the 4W-DL-L drive mode.

As is apparent from the above description, when the transfer gear assembly 3 is shifted between the high and low speed drive mode H and L, the transfer gear shift means 11 is mechanically connected to the drive mode selecting lever 65 through the cable 61, the shift control rod 56 and the shift rod 37 with the skid shift means 50 and operated directly by the driver. Owing to this mechanical and direct operation, the transition of the transfer gear assembly 3 is taken certainly and smoothly even though a large force is required to shift the transfer gear shift means 11.

The controller 100 sequentially controls operations of various elements, for example the motor 81, solenoid valves 131 and 132, and drive mode graphic display 90. The operation of the controller 100 will be described with reference to FIGS. 8 to 15 showing several flow charts of a main routine and subroutines. It is to be noted in FIGS. 8 through 15 that effected at steps indicated by S38 are decisions, although not illustrated by a diamond.

Figure 8:
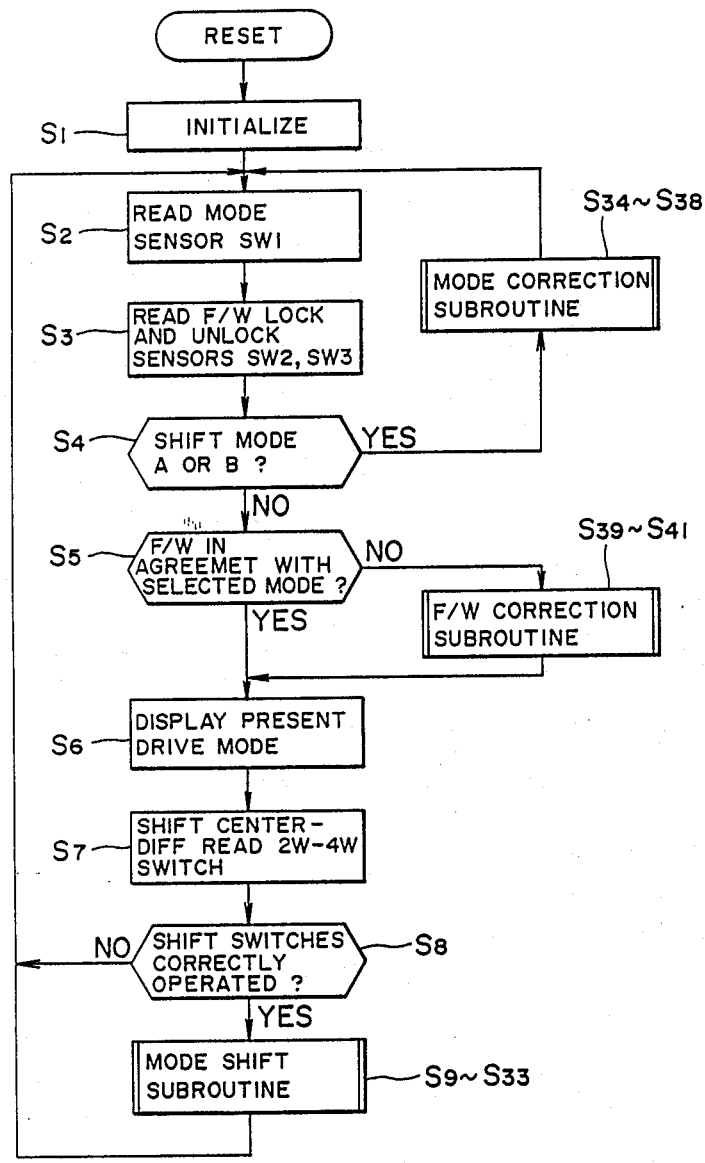
FIG. 8 is a flow chart showing a main routine of control for the part-time four-wheel drive vehicle operating system of FIG. 6.

Referring now to FIG. 8, which is a flow chart illustrating a main routine for the controller 60, in particular the CPU included therein, the first step S1 is to initialize. Following the initialization, the next step is to read the condition of the drive mode sensor SW1 at a second step S2 and to read the conditions of the free-wheeling lock sensor SW2 and the free-wheeling unlock sensor SW3 at a third step S3. At a step S4, based on the condition of the drive mode sensor SW1, a first decision is made to determine whether the transfer case T is in a shift mode A ( in which the transfer case T is shiftable between the 2W-H drive mode and 4W-DL-H drive mode ) or in a shift mode B ( in which the transfer case is shiftable between the 4W-DL-H and 4W-DF-H drive modes ). In other words, a decision regarding whether the transfer case T has been ready for any shift mode other than a shift mode between the H and L drive modes. If the answer is yes, indicating the transfer case T is in the shift mode A or B, a mode correction subroutine shown in FIG. 9 is called for.

Figure 9:
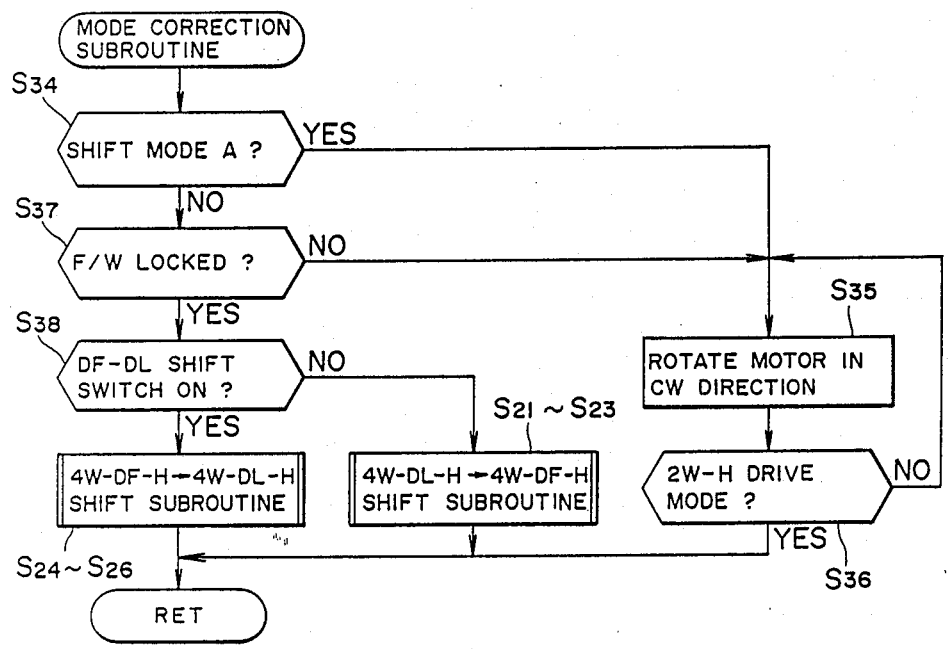
FIG. 9 is a flow chart showing a mode correction subroutine of control for the part-time four-wheel drive vehicle operating system of FIG. 6.

Referring to FIG. 9, which is a flow chart of the mode correction subroutine, the first step S34 in FIG. 9 is to make a first decision: "is the transfer case ready for the shift mode A ?" If the answer to the first decision is yes, the motor 81 is caused to rotate in the CW direction ( counterclockwise direction) at a step S35 so as to shift the transfer case T into the 2W-H drive mode. When the motor 81 is rotated, a second decision is made based on the drive mode signal provided by the mode sensor SW1 at a step S36: "is the transfer case T shifted in 2W-H drive mode ?" This second decision is repeated until the transfer case T is completely shifted into the 2W-H drive mode. If the answer to the second decision regarding of the transition of the transfer case T is yes, the final step orders return to the main routine.

If the answer to the first decision at the step 34 regarding to the shift mode of the transfer case T is no, a third decision is made based on the conditions of free-wheeling lock and unlock sensors SW2 and SW3 at a step S37: "is the free-wheeling means locked ?" If the answer to the third decision is no, indicating the free-wheeling means 130 is unlocked or free, the motor 81 is caused to rotate so as to shift the transfer case T into the 2W-H drive mode. On the other hands, if the answer to the third decision is yes, a fourth decision is made based on the operated condition of the drive mode selecting lever 65 at a step S38: " is the DL drive mode is selected ?" According to the answers to the fourth decision, a third or a fourth drive mode shift subroutine are called for. Specifically, if the answer is no, the third shift subroutine is called for and, on the other hand, if yes, the fourth shift subroutine is called for. These third and fourth drive mode shift subroutines will be described along with first, second and fifth drive mode shift subroutines in detail later.

Referring back to the main routine in FIG. 8, If the answer to the first decision at the step S4 is no, a second decision in the main routine is made at a step S5: "is the drive mode of the transfer case T in agreement with the state of the free-wheeling means 130 ?" If the answer to the third decision is no, a free-wheeling (F/W) mode correction subroutine is called for.

Figure 10:
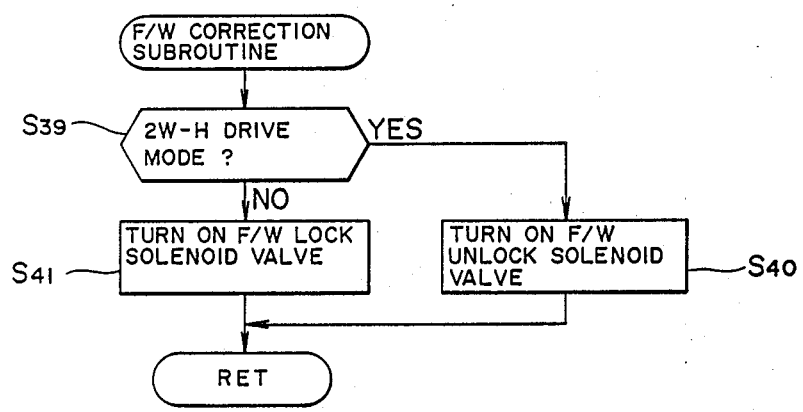
FIG. 10 is a flow chart showing a free-wheeling correction subroutine for the part-time four-wheel drive vehicle operating system of FIG. 6.

Referring now to FIG. 10, which is a flow chart of the free-wheeling (F/W) mode correction subroutine, the first step S39 in FIG. 10 is to make a first decision: "is the transfer case T in the 2W-H drive mode ?" If the answer to the first decision is yes, an actuation signal is applied to the first solenoid valve 131 to turn it on at a step S40 so as to unlock or free the axle splitting means 120 of the free-wheeling means 130 so as to shift it into its unlock or free state. If the answer to the first decision is no, an actuation signal is applied to the second solenoid valve 132 to turn it on at a step S41 so as to lock the free-wheel means 85, thereby to shift it into its locked state. In any case, the final step orders return to the main routine. Referring back to FIG. 8, at a step S6 in the main routine, the controller 100 causes the drive mode graphic display 91 to switch on or off the 4WD lamp 83 and the C/D lamp 84 in the patterns shown in the following table so as to display a present driving mode.

| Drive Mode | 4WD Lamp (92A) | C/D Lamp (93B) |
| --- | --- | --- |
| 2W-H | OFF | OFF |
| 4W-DL-H | ON | ON |
| 4W-DF-H | ON | OFF |

A step S7 following the indication of drive mode is to read the conditions of the drive mode selecting lever 56 through the position sensor 62 to make a third decision at a step S8 in the main routine: "is the drive mode selecting lever 56 correctly operated with respect to the present drive mode ?" If the answer to the third decision is no, the step S2 through S7 are repeated. On the other hand, if the answer to the third decision is yes, first trough fifth drive mode shift subroutine are selectively called for according to operated states of the drive mode selecting lever 65.

Figure 11:
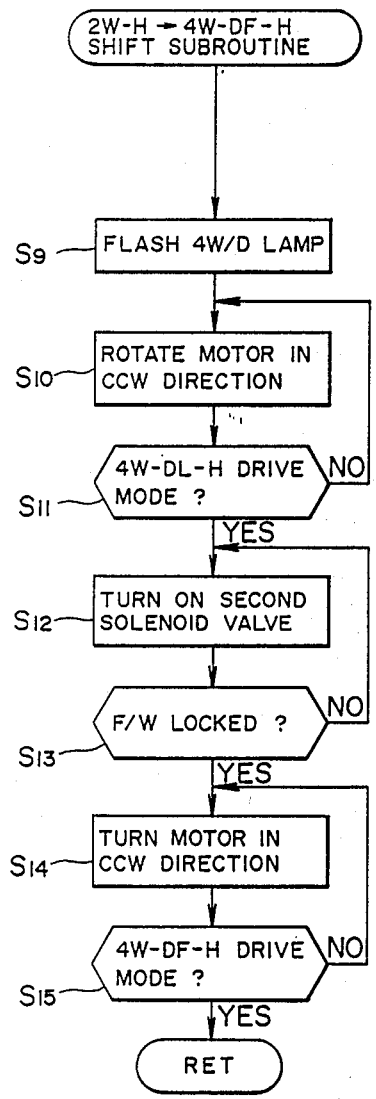
FIG. 11 is a flow chart showing a drive mode shifting subroutine for the part-time four-wheel drive vehicle operating system of FIG. 6 wherein the transfer case is shifted from a two-wheel high-speed drive mode into a four-wheel differential-free high-speed drive mode.

Referring now to FIG. 11, which is a flow chart of the first drive mode shift subroutine for shifting the transfer case T from the 2W-H to the 4W-DF-H drive mode, the first step at S9 in FIG. 11 is to flash the 4WD lamp 92A upon receiving an instruction signal provided by an operation of the drive mode selecting lever 65 in such a way that a turned-on time period is longer than a turned-off time period, thereby to indicate that the transfer case T is now being shifted into the 4W from the 2W drive mode. At a step S10, the motor 81 is caused to rotate in the counterclockwise direction (which is referred to as CCW direction) to slide the second clutch sleeve 44 toward the position $P_{4L}$ from the position $P_2$. Then a first decision in this subroutine is made based on the drive mode signal provided by the mode sensor SW1 at a step S11: "is the transfer case T shifted into 4W-DL-H drive mode ?" If the answer to the first decision is no, the steps S10 and 11 are repeated until the transfer case T is shifted in the 4W-DL-H drive mode. If the answer to the first decision is yes, indicating that the transfer case T is completed to shift into the 4W-DL-H drive mode, the controller 100 at a step S12 provides an actuating signal which actuates the second solenoid valve 132 to connect the axle splitting means 120 of the free-wheeling means 130, locking the free-wheeling means 130. As the free-wheeling lock sensor SW2 detects the shift control rod 122 of the axle splitting means 120 at its connecting position to provide a signal, a second decision is made at a step S13: "is the free-wheeling means locked ?". If the answer to the second decision is no, the steps S12 and S13 are repeated until the lock sensor SW2 provides a lock signal, namely, the free-wheeling means 130 is completely locked. If the answer is yes, the motor 81, at a step 15, is caused to rotate in the CCW direction to displace the second shift clutch 44 to the position $P_{4L}$ from the position $P_{4F}$ so as to shift the transfer case T into 4W-DF-H drive mode. At the final step S15 in this subroutine, a third decision is made based on the mode signal provided by the mode sensor SW1: "is the transfer case T is shifted into the 4W-DF-H drive mode ?" If the answer to the third decision is no, the steps S14 and S15 are repeated until the transfer case T is shifted into the 4W-DF-H drive mode. On the other hand, if the answer to the third decision is yes, then the final step orders return to the main routine.

Figure 12:
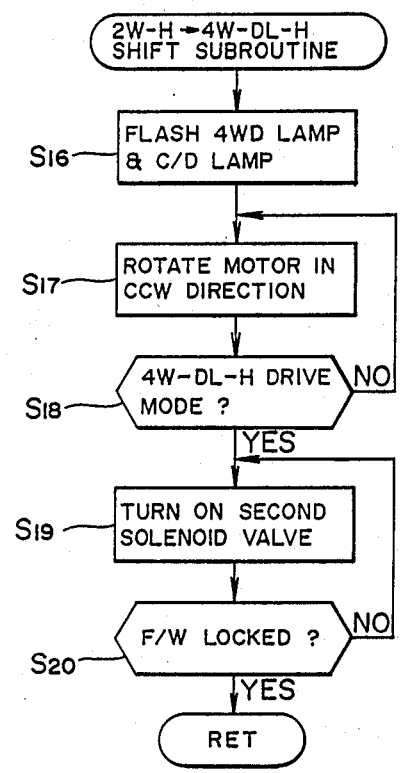
FIG. 12 is a flow chart showing a drive mode shifting subroutine for the part-time four-wheel drive vehicle operating system of FIG. 6 wherein the transfer case is shifted from the two-wheel high-speed drive mode into four-wheel differential-locked high-speed drive mode.
Figure 13:
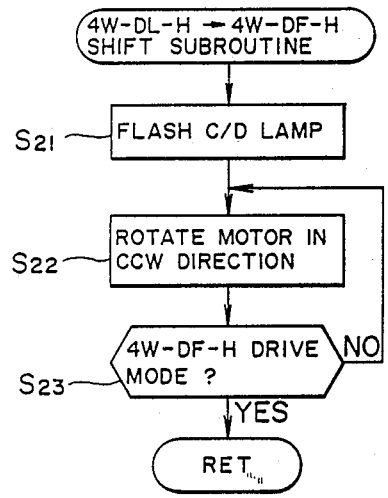
FIG. 13 is a flow chart showing a drive mode shifting subroutine for the part-time four-wheel drive vehicle operating system of FIG. 6 wherein the transfer case is shifted from the four-wheel differential-locked high-speed drive mode into the four-wheel differential-free high-speed drive mode.

Referring now to FIG. 13, which is a flow chart of the second drive mode shift subroutine for shifting the transfer case T into the 4W-DL-H from 2W-H drive mode, the first step S16 in FIG. 12 is to read the conditions of the drive mode selecting lever 65 so as to flash the 4WD lamp 92A and the C/D lamp 93B in the same way as at the step S9 in the first drive mode shift subroutine. Taken following the first step S16 are steps S17 to S20 which have substantially the same operations or decisions as the steps S10 to S13 in the first drive mode shift subroutine shown in FIG. 11. Therefore, no repetition of description is needed here. If the answer to the second decision at the step S20 regarding whether the free-wheeling means 130 is locked is yes, then the final step orders return to the main routine shown in FIG. 8.

FIG. 13 is a flow chart of the third drive mode shift subroutine for shifting the transfer case T into 4W-DF-H drive mode from the 4W-DL-H drive mode. The first step S21 in FIG. 13 is to read the condition of the drive mode selecting lever 65 so as to flash the C/D lamp 93B of the graphic display 91. Following the flash of the C/D lamp 93B, the motor 81 is caused to rotate in the CCW direction to displace the second shift clutch 44 so as to shift the transfer case T into the 4W-DF-H drive mode from the 4W-DL-H drive mode. At the final step S23 a first decision in the third drive mode shift subroutine is made based on the drive mode signal provided by the mode sensor SW1: "is the transfer case T shifted into the 4W-DF-H drive mode?" If the answer to the first decision is no, the steps S22 and S23 are repeated until the transfer case T is completely shifted into the 4W-DF-H drive mode. If the answer is yes, then the final step orders return to the main routine shown in FIG. 8.

Figure 14:
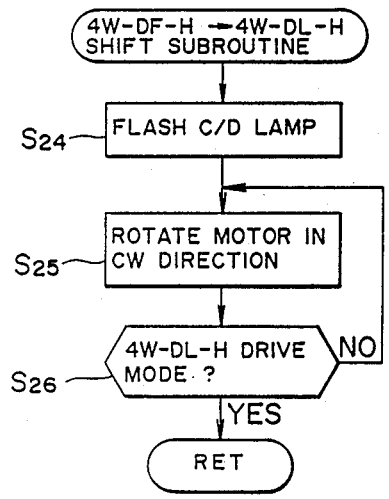
FIG. 14 is a flow chart showing a drive mode shifting subroutine for the part-time four-wheel drive vehicle operation system of FIG. 6 wherein the transfer case is shifted from the four-wheel differential-free high-speed drive mode into the four-wheel differential-locked high-speed drive mode.

Referring now to FIG. 14, which is a flow chart of the fourth drive mode shift subroutine for shifting the transfer case into the 4W-DL-H drive made from the 4W-DF-H drive mode. In this fourth drive mode shift subroutine, when the drive mode selecting lever 65 is operated from the position $_{4HF}$ to the position $P_{4HL}$, a signal is provided to cause the C/D lamp 93B to flash at a first step S24. At a second step S25 following the flashing of the C/D lamp 93B, the motor 81 is caused to rotate in the CW direction so as to shift the transfer case T in the 4W-DL-H drive made. The final step S26 is to make a first decision in FIG. 14: "is the transfer case T shifted into the 4W-DL-H drive mode ?" This first decision is made based on the drive mode signal provided by the mode sensor SW1. If the answer to the first decision is no, indicating the transfer case T not yet completely shifted in the 4W-DL-H, the steps S26 and S27 are repeated. If the answer to the first decision is yes, the final step S26 orders return to the main routine shown in FIG. 8.

Figure 15:
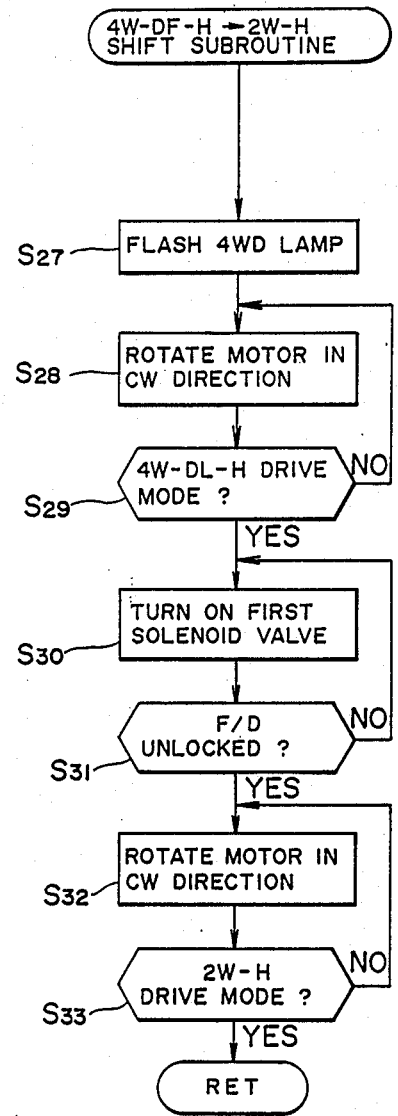
FIG. 15 is a flow chart showing a drive mode shifting subroutine for the part-time four-wheel drive vehicle operating system of FIG. 6 wherein the transfer case is shifted from the four-wheel differential-free high-speed drive mode into the two-wheel high-speed drive mode.

Finally, referring to FIG. 15, which is a flow chart of the fifth drive mode shift subroutine for shifting the transfer case T into the 2W-H drive mode from the 4W-DF-H drive mode, the first step S27 is to cause the 4WD lamp 92A of the graphic display 91 to flash. However, in this fifth drive mode shift subroutine, contrary to the first drive mode shift subroutine shown in FIG. 11, the 4W lamp 83 is turned on for a time period shorter than the turned-on time period so as to indicate that the transfer case T is begun to be shifted into 2W-H drive mode. At a second step S28 following the flash of the 4W lamp 83, the motor 81 is caused to rotate in the CW direction to return the transfer case T into the 4W-DL-H drive mode. When the motor 81 begins to rotate, a first decision in this fifth drive mode shift subroutine is made based on the drive mode signal provided by the mode sensor SW1 at a step S29: "is the transfer case T shifted into 2W-DL-H drive mode?" If the answer to the first decision is no, the steps S28 and S29 are repeated. On the other hand, if the answer to the first decision is yes, indicating that the transfer case T is shifted into the 2W-DL-H drive mode, the controller 100 provides a shift signal by which the first solenoid valve 131 is energized at a step S30 to disconnect the split means 120 of the free-wheeling means 130 so as to unlock the free-wheeling means 130.

The final step orders return to the main routine shown in FIG. 9.

As is apparent from the above description, because, as long as the shift mode A is detected, the mode correction subroutine shown in FIG. 9 is repeated, the shift of the transfer case T from the 4W-DL-H drive mode to the 2W-H drive mode is disabled even though the 2W-4W shift switch 68A is secondarily operated with or without an intention to shift the transfer case T into the 2W-H drive mode. Therefore, the controller 60 can prevent the transfer case T from being shifted to the 2W drive mode from the 4W-DL drive mode. In this sense, the controller 60 functions as inhibitive means for the shift of the transfer case T from the 4W-DL-H drive mode to the 2W-H drive mode.

Figure 16:
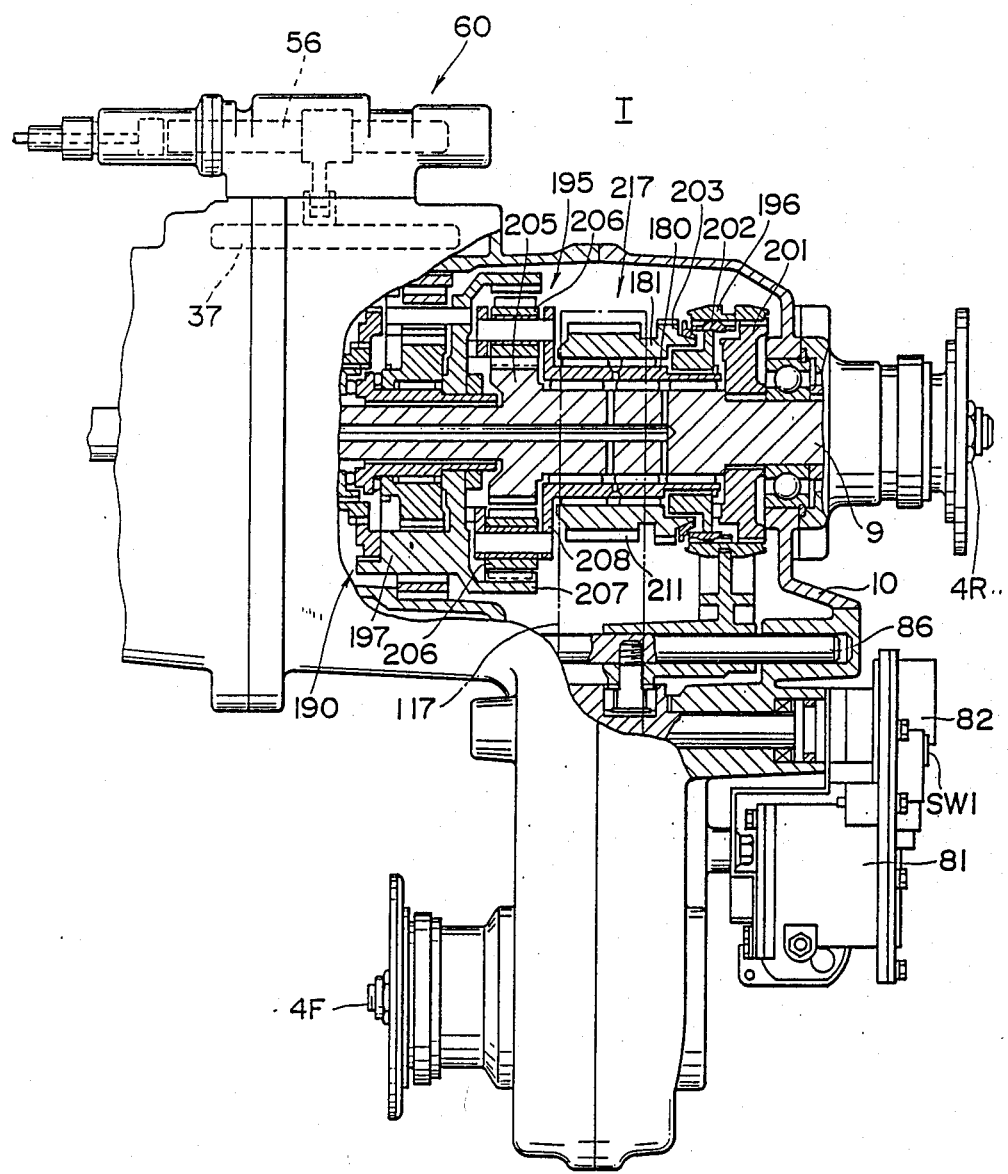
FIG. 16 is a side view, partly in cross section, showing another transfer case used on the part-time four-wheel drive vehicle of FIG. 1.

Reference is now had to FIG. 16 showing another transfer case to which operating system according to the present invention is embodiment The difference of this transfer case from the previously described one in association with FIGS. 2 to 5 is in the arrangement of the center-differential gear assembly, so that operation and construction of the transfer case excepting the center-differential need not be explained in detail therein.

As shown, a center-differential gear assembly 195 in this embodiment mounted on the rear output shaft 4R of the transfer case T and adjacent to and coaxially with a transfer gear assembly 190. This center-differential gear assembly 195 consist of a planetary gear assembly that comprises a sun gear 205 formed with a periphery of the middle section of the rear output shaft 4R; a ring gear 207 formed integrally with rear end portion of the carrier member 197 of the transfer gear assembly 190; and pinion gears 206 rotatably attached to a carrier member 208 which is integral with first sleeve shaft 180 mounted on the rear output shaft 4R for rotation.

On the rear side of the center-differential gear assembly 195, there is the differential gear shift means 217 which shifts the center-differential gear assembly 195 between the differential-free (DF) and differential-locked (DL) drive modes, or between the two-wheel (2W) and four-wheel (4W) drive modes. This differential gear shift means 217 consists of first externally splined clutch ring 201 spline-coupled to the rear output shaft 4R, second externally splined clutch ring 202 spline-coupled to the first sleeve shaft 180 which is spline-coupled to the rear output shaft 4R, third externally splined clutch ring 203 formed integrally with a sleeve shaft 181 which is mounted on the first sleeve shaft 180 for rotation, and a clutch sleeve 196. This clutch sleeve 196, which is spline-coupled to a clutch ring 202, is axially movable to selectively engage with the first clutch ring 201 or the third clutch ring 203 so as to shift the center-differential gear assembly 195 into a desired drive mode. The second sleeve shaft 181 i integrally formed with a driving sprocket wheel 211 which is connected to a driven sprocket wheel formed integrally with the front output shaft 4F by means of a chain 117, these elements being the same in construction and function as those in the previous embodiment shown in detail in FIG. 2.

This differential gear shift means 217 can shift the center-differential gear assembly 195 into three different drive modes, namely, 2W drive mode, 4W-DF drive mode, and 4W-DL drive mode.

When the differential gear shift means 217 is ready for the 2W drive mode as is shown in FIG. 16, the clutch sleeve 196 is in engagement with the first and second clutch rings 201 and 202 and, on the other hand, in disengagement over the third clutch ring 203. Under this 2W drive mode, the sun gear 205 and the pinion gears 206 of the planetary gear assembly are locked together, transmitting driving power from the ring gear 207 of the planetary gear assembly directly to the rear output shaft 4R.

When the differential gear shift means 217 is ready for 4W-DF drive mode, the clutch sleeve 196 is brought into spline engagement with the second and third clutch rings 202 and 203 but out of engagement over the first clutch ring 201. Therefore, the first and second sleeve shafts 180 and 181 are locked together through the second and third clutch rings 202 and 203 to shift the center-differential gear assembly 195 into 4-W-DF mode. As a result, the center-differential gear assembly 195 allows the front and rear output shafts 4F and 4R to turn at different speeds when negotiating turn.

When the differential gear shift means 217 is ready for the 4W-DL drive mode, the clutch sleeve 196 is placed in engagement with all the three clutch rings, namely the first, second and third clutch rings 201, 202 and 203. Under this 4W-DL drive mode, the first and second sleeve shafts 180 and 181 are locked together to maintain the center-differential gear assembly 195 in the 4W drive mode. Simultaneously, since the rear output shaft 4R and the first sleeve shaft 220 are locked together, the center-differential gear assembly 195 is shifted into the 4W-DL drive mode. As a result, although the center-differential gear assembly 195 drives the front and rear output shafts 4F and 4R at the same time but prevents them from turning at different speeds.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. In an operating system used in a vehicle equipped with four-wheel drive having a center-differential which is shiftable between a differential-locked and a differential-free drive mode of operation and between a two-wheel and a four-wheel drive mode of operation, and a free-wheeling device with a clutch means incorporated in an output shaft of an axle differential in association with wheels which are non-driven when the vehicle is in said two-wheel drive mode of operation, said clutch means being adapted to disconnect the transmission of driving power between said axle differential and said non-driven wheels when the vehicle is in said two-wheel drive mode of operation and to connect a transmission of driving power between said axle differential and said wheels when the vehicle is in said four-wheel drive mode of operation, the improvement comprising:

transfer case shift means operable between at least two positions for selecting said two-wheel drive mode and four-wheel, differential-free drive mode; and shift control means responsive to an operation of said transfer case shift means for shifting said center-differential to from one to the other between said two-wheel drive mode and four-wheel, differential-free drive mode, said shift of drive mode of said center-differential being accompanied by an intermediate transition of said center-differential to a differential-locked drive mode.

2. In an operating system as defined in claim 1, wherein said shift control means, after said intermediate transition of said center-differential to said differential-locked drive mode, causes said clutch means to connect the transmission of driving power between said axle differential and said non-driven wheel when said center-differential is shifted to said four-wheel drive mode and to disconnect the transmission of drive power between them when said center-differential is shifted to said two-wheel drive mode.

3. In an operating system as defined in claim 2, further comprising:

shift control means actuator caused by an operation of said transfer case shift means for actuating said shift control means to shift said center-differential among said two-wheel, four-wheel differential-locked, and four-wheel differential-free drive modes;

a drive mode sensor for detecting a drive mode into which said center-differential is shifted to provide a mode signal corresponding to a detected drive mode;

a clutch actuator for actuating said clutch means to connect and disconnect the transmission of driving power between said axle differential and said non-driven wheel;

a clutch condition sensor for detecting a condition of said clutch to provide a clutch connection or disconnection signal; and control means for actuating in order; said shift control means actuator to cause said shift control means so as to shift said center-differential from said two-wheel into said four-wheel differential-locked drive mode; said clutch actuator to connect the transmission of driving power between said axle differential and said non-driven wheel upon a provision of mode signal corresponding to said four-wheel differential-locked drive mode by said drive mode sensor; and again said shift control means actuator to shift said shift control means so as to shift said center-differential from said four-wheel differential-locked drive mode into said four-wheel differential-free drive mode upon a provision of said clutch disconnection signal by said clutch condition sensor, when said transfer case shift means is operated from said two-wheel driving selecting position to said four-wheel drive mode selecting position.

4. In an operating system as defined in claim 2, further comprising:

shift control means actuator caused by an operation of said transfer case shift means for causing said shift control means to shift said center-differential among said two-wheel, four-wheel differential-locked and four-wheel differential-free drive modes;

a drive mode sensor for detecting a drive mode into which said center-differential is shifted to provide a mode signal corresponding to said detected drive mode;

a clutch means actuator for actuating said clutch means to connect and disconnect the transmission of driving power between said axle differential and said non-driven wheel;

a clutch sensor for detecting a condition of said clutch means to provide or not provide a clutch condition signal; and control means for actuating in order; said shift control means actuator to cause said shift control means so as to shift said center-differential from said four-wheel differential-free drive mode to said four-wheel differential-locked drive mode; said clutch actuator to disconnect the transmission of driving power between said axle differential and said non-driven wheel upon a provision of said mode signal corresponding to said four-wheel differential-locked drive mode from said mode sensor; and again said shift control means actuator to cause said shift control means so as to shift said center-differential from said four-wheel differential-locked drive mode to said four-wheel differential-free drive mode upon a provision of said clutch disconnection signal from said clutch condition sensor, when said transfer case shift means is operated from said four-wheel drive mode selecting position to said two-wheel drive mode selecting position.

5. In an operating system as defined in claim 1, wherein said transfer shift means has at least three drive mode selecting positions for two-wheel, four-wheel differential-free, and four-wheel differential-locked drive modes, said two-wheel drive mode selecting position being adjacent to said four-wheel differential-free drive mode selecting position.

6. In an operating system as defined in claim 5, wherein said shift control means is movable between three positions; a two-wheel drive mode shift position for disconnecting the transmission of driving power between an input shaft of said transfer case and said output shaft of said axle differential; four-wheel differential-locked drive mode shift position for connecting the transmission of driving power between said input shaft of said transfer case and said output shaft of said axle differential and locking said center-differential; and a four-wheel differential-free drive mode shift position for connecting the transmission of driving power between said input shaft of said transfer case and said output shaft of said axle differential and unlocking said center-differential, arranged in this order.

7. In an operating system as defined in claim 6, wherein said center-differential comprises; a planetary gear assembly having a sun gear member with an integral spline, pinion gears, pinion carrier member, and a ring gear member with an integral spline; sprocket member with an integral spline which is operationally coupled to said axle shaft in association with said un-driven wheel; and an axially movable splined sleeve clutch member; all these members being arranged coaxially with respect to the axis of rotation of said input shaft of said transfer case, said axially movable sleeve clutch member being moved to couple together said ring gear and sun gear members through a spline engagement for two-wheel drive mode; said ring gear, sun gear and sprocket members a spline engagement for four-wheel differential locked drive mode; and said sun gear and sprocket members through a spline engagement for four-wheel differential-free drive mode.

8. In an operating system as defined in claim 7, wherein said clutch means of said free-wheeling device is actuated by means of a diaphragm actuator.

9. In an operating apparatus as defined in claim 6, wherein said center-differential comprises; a planetary gear assembly having a sun gear member with an integral spline, pinion gears, a pinion carrier member with an integral spline, and a ring gear member; a sprocket member with an integral spline which is operationally coupled to said axle shaft in association with said non-driven wheel; an axially movable sleeve clutch member; all these members being arranged coaxially with respect to the axis of rotation of said input shaft of said transfer case, said axially movable sleeve clutch member being axially moved to couple together said sun gear and pinion carrier members through a spline engagement for two-wheel drive mode, said sun gear, pinion carrier, and sprocket members through a spline engagement for four-wheel differential-locked drive mode, and said pinion carrier and sprocket members through a spline engagement for four-wheel differential-free drive mode.

10. In an operating system as defined in claim 1, wherein said shift control means is movable between three positions; a two-wheel drive mode shift position for disconnecting the transmission of driving power between said input shaft of said transfer case and said output shaft of said axle differential, a four-wheel differential-locked drive mode shift position for connecting the transmission of driving power between said input shaft of said transfer case and said output of said axle differential and locking said center-differential, and a four-wheel differential-free drive mode shift position for connecting the transmission of driving power between said input shaft of said transfer case and said output shaft of said axle differential and unlocking said center-differential, arranged in this order.

11. A method of operating a part-time four-wheel drive vehicle having a center-differential shiftable between two-wheel and four-wheel drive modes and between differential-locked and differential-free drive modes, and a free-wheeling device with clutch means incorporated in an output shaft of an axle differential associated with wheels which are non-driven when the vehicle is in the two wheel drive mode, said clutch means being adapted to disconnect the transmission of driving power between an input shaft of the center-differential and an output shaft of the axle differential when the vehicle is in said two-wheel drive mode and to connect the transmission of driving power between an output of the center-differential and an output shaft of said axle differential when the vehicle is in said four-wheel drive mode, comprising the steps of:

provide a shift control signal for shifting said center-differential from said two-wheel to said four-wheel differential-free drive mode;
actuating control means responding to the provision of said shift control signal to shift said center-differential into said four-wheel differential-locked drive mode from said two-wheel drive mode and to provide a differential lock signal when said shifting is accomplished;
locking said clutch means of said free-wheeling device responding to the provision of said differential lock signal;
providing a clutch lock signal when said locking is accomplished; and
actuating said control means responding to the provision of said clutch lock signal to shift said center-differential into said four-wheel differential-free drive mode from said four-wheel differential-locked drive mode.

12. A method of operating a part-time four-wheel drive vehicle having a center-differential shiftable between two-wheel and four-wheel drive modes and between differential-locked and differential-free drive modes, and a free-wheeling device with clutch means incorporated in an output shaft of an axle differential associated with wheels which are non-driven when the vehicle is in the two wheel drive mode, said clutch means being adapted to disconnect the transmission of driving power between an input shaft of the center-differential and an output shaft of the axle differential when the vehicle is in said two-wheel drive mode and to connect the transmission of driving power between an output of the center-differential and an output shaft of said axle differential when the vehicle is in said four-wheel drive mode, comprising the steps of:

providing a shift control signal for shifting said center-differential from said four-wheel differential-free to said two-wheel drive mode;
actuating control means responding to the provision of said shift control signal to shift said center-differential into said four-wheel differential-locked drive mode from said four-wheel differential-free drive mode and to provide a differential lock signal when said shifting is accomplished;
unlocking said clutch means of said free-wheeling device responding to the provision of said differential lock signal;
providing a clutch unlock signal when said unlocking is accomplished; and
actuating said control means responding to the provision of said clutch unlock signal to shift said center-differential into said two-wheel drive mode from said four-wheel differential-locked drive mode.

* * * * *